United States Patent [19]

Rechsteiner

[11] Patent Number: 4,850,542

[45] Date of Patent: Jul. 25, 1989

[54] WINDING APPARATUS UTILIZING MAGNETIC CARRIER UNITS

[75] Inventor: Emil B. Rechsteiner, Groton, Mass.

[73] Assignee: Isoreg Corporation, Littleton, Mass.

[21] Appl. No.: 170,257

[22] Filed: Mar. 18, 1988

Related U.S. Application Data

[62] Division of Ser. No. 901,305, Aug. 28, 1986, Pat. No. 4,752,042.

[51] Int. Cl.[4] ........................ H01F 41/08; B65G 17/46

[52] U.S. Cl. ...................................... 242/7.07; 226/93; 198/690.1; 198/853; 198/805; 59/78

[58] Field of Search .................... 242/7.03, 7.07, 7.04; 226/93, 168, 170–173; 198/690.1, 805, 850–853; 59/78, 78.1, 84; 335/219

[56] References Cited

U.S. PATENT DOCUMENTS

| | | | |
|---|---|---|---|
| 4,067,438 | 1/1978 | Spurr et al. | 198/805 |
| 4,236,632 | 12/1980 | Spodig | 198/690.1 |
| 4,315,568 | 2/1982 | Mojden | 198/690.1 |
| 4,351,430 | 9/1982 | Mojden | 198/690.1 |
| 4,586,601 | 5/1986 | Hodlewsky | 198/690.1 |

*Primary Examiner*—Stuart S. Levy
*Assistant Examiner*—Steven M. DuBois
*Attorney, Agent, or Firm*—Joseph S. Iandiorio; Douglas E. Denninger

[57] ABSTRACT

A winding apparatus for winding a magnetic element through a form, the apparatus having at least one chain which has a plurality of magnetic carrier units disposed about the form for loading the coil of the element through the form and, after loading, for winding the element from the loading coil about the form under tension to tightly wind a final coil. Each carrier unit includes a device for generating a magnetic force to magnetically hold the element and to release portions of the element when tension on the element between the outer periphery of the final coil and the advancing point of separation of the element from the inner periphery of the loading coil exceeds the magnetic force exerted by the carrier units. The winding apparatus also includes a device for driving the chain during loading and winding, and structure for defining the path of the chain during loading and winding.

7 Claims, 7 Drawing Sheets

WINDING APPARATUS UTILIZING MAGNETIC CARRIER UNITS

This is a division of application Ser. No. 901,305, filed Aug. 28, 1986 now U.S. Pat. No. 4,752,042.

FIELD OF INVENTION

This invention relates to an improved apparatus for winding a magnetic element about a form using magnetic carrier units in one or more carrier chains and more particularly to such a carrier unit and chain which attract, transport, and controllably release the magnetic element as it is wound about the form.

BACKGROUND OF INVENTION

Formation of loops or coils of a material passing through an opening of an object presents certain difficulties of manufacture. Constructing cores for electromagnetic induction devices such as transformers presents a typical manufacturing situation. One manufacturing method involves assembling individual core sections or segments to form a core that fills the opening and partially or wholly surrounds one or more transformer inductance coils. Another method involves winding a ribbon of material such as steel about a mandrel to preform the core in the desired shape, severing the core, and reassembling it to fill and surround the inductance coil.

Transformer cores constructed by winding a ribbon of transformer steel into a shape of a ring or a squared-off "O" offer certain advantages over transformer cores assembled from individual laminar sections of transformer steel: "wound" cores pack steel very tightly, hence permitting construction of transformers that are compact and that exhibit comparatively low electrical losses. Wound cores, moreover, allow rapid assembly of transformers and permit construction of transformers that are comparatively quiet.

However, wound cores have in the past had certain disadvantages. Compared with conventional laminar cores, pre-wound transformer cores are expensive as they require extensive manufacturing operations prior to their being available for transformer manufacturing. After winding about a mandrel is completed, the cores are annealed for many hours at high temperatures, often in a reduction atmosphere of hydrogen or nitrogen. The annealing process relaxes the strains introduced into the metal by the winding process.

Subsequent to annealing, the cores are subjected to a pressurized varnishing process and are then baked at elevated temperatures to cure the varnish. After baking, the cores typically are cut in a direction diametric to the direction of the wound steel and in a way that yields two pieces that eventually fit together precisely. After this cutting operation, the cut surfaces are often etched with acid to remove from the cut surface small metal burrs that result from the cutting action. Such burrs are undesirable because they tend to bridge the cut pieces of steel and, in service, tend to cause undesirable, heat-producing eddy-currents.

After etching of the cut surfaces, the pre-wound core pieces customarily are lapped at the cut surfaces, then are numbered for later matching of halves. They are then dipped in a plastic substance to protect the cut and etched surfaces from scratches and marring and to keep matching core pieces from being separated. When the cores are used in the manufacture of transformers, the two matching pieces are temporarily separated, and one or more inductance coils are arranged together with one or more wound cores to form a magnetic/electrical circuit such as is commonly used in transformers, inductors or saturable reactors. The previously cut core pieces are then customarily kept securely joined by means of a strapping band made of steel, stainless steel, or some other material exhibiting high tensile strength.

Other methods avoid previously winding the core by transferring core ribbon from a roll to form a coil larger in diameter yet thinner in thickness which, driven by friction rollers, revolves freely through the opening of the inductance coil. In some methods the coil is then simply increased in thickness to approach the outer bounds of the inductance coil opening. Other methods proceed, after the original roll is emptied, to continue revolving the coil in the same direction about a leg of the inductance coil after attaching a terminal end of the ribbon to the inductance coil. The ribbon thereby is wound directly about the inductance coil itself. In yet another method, the newly-formed coil is tightened by pulling the ribbon toward the original roll after attaching the terminal end to the inductance coil.

One winding apparatus presently uses electromagnetically operated grippers for physically grasping a coil of wire to rotate it during winding. However, the grippers completely surround the coil and do not rely on magnetic attraction to transport the coil.

Another winding apparatus uses retention roller assemblies disposed about the inside of a loading coil of an element to successively release the element when tension on the element exceeds a predetermined threshold. Each roller assembly responds to the tension by rising and separating its roller pair to physically release the element which is then wound about a form under tension. This apparatus is relatively complex in construction and its speed is limited by the response time of the roller assemblies.

SUMMARY OF INVENTION

It is therefore an object of this invention to provide an improved apparatus for winding a magnetic element tightly about a form.

It is a further object of this invention to provide such a winding apparatus which winds the magnetic element more rapidly than other winding systems.

It is a further object of this invention to provide such a winding apparatus which is relatively simple in construction.

A still further object of this invention is to provide such a winding apparatus which is inexpensive to construct.

It is a further object of this invention to provide such a winding apparatus which is reliable during operation.

It is a further object of this invention to provide such a winding apparatus which utilizes one or more chains of magnetic carrier units.

Yet another object of this invention is to provide a magnetic carrier unit and a chain of carrier units which effectively transport a magnetic element.

It is a further object of this invention to provide such a carrier unit and carrier chain which are less complex than other carrier devices.

It is a further object of this invention to provide such a carrier unit and carrier chain which controllably release the magnetic element.

It is a further object of this invention to provide such a carrier unit and carrier chain which release the element magnetically rather than physically.

It is a further object of this invention to provide such a carrier unit and carrier chain which are inexpensive to manufacture.

This invention features a winding apparatus for winding a magnetic element through a form. There are at least one chain having a plurality of magnetic carrier units disposed about the form for loading a coil of the element through the form and, after loading, for winding the element from the loading coil about the form under tension to tightly wind a final coil. Each carrier unit includes means for generating a magnetic force to magnetically hold the element and to release successive portions of the element when tension on the element between the outer periphery of the final coil and the advancing point of separation of the element from the inner periphery of the loading coil exceeds the magnetic force exerted by the carrier units. There are also means for driving the chain during loading and winding and means for defining the path of the chain during loading and winding.

In one embodiment, the means for defining includes guide means for curving the path of the chain to establish the curvature of the loading coil. Each magnetic carrier unit includes means for interlocking the carrier unit with the guide means during travel of the chain. The means for interlocking may include track bearings mounted on the underside of the carriage and rollably receivable by the guide means.

In another embodiment, each carrier unit includes means for engaging the drive means such as friction material disposed on a portion of the underside of the carrier unit. Each carrier unit includes at least one permanent magnet and the winding apparatus further includes means for biasing the loading coil toward the chain during loading. The means for biasing may include a plurality of hold-down wheels, and means for mounting the hold-down wheels inside of the coil and biasing them toward it. The winding apparatus includes two continuous chains of magnetic carrier units which may be positioned oppositely about the perimeter of the loading coil.

This invention also features a magnetic carrier unit for transporting and controllably releasing a magnetic element, and a carrier chain comprised of a number of magnetic carrier units. Each unit includes a carriage which has a floor and two raised opposing sides spaced to accommodate a magnetic element, and means, disposed in the carriage, for generating a magnetic force to hold the magnetic element. There are also linkage means for joining the unit with adjacent carrier units.

In one embodiment, the carriage of the carrier unit includes means for engaging one or more drive means for propelling the carrier unit, such as friction material disposed on a portion of the underside of the carriage. The means for magnetically attracting includes at least one permanent magnet or at least one electromagnet. There may be at least one permanent magnet associated with each of the floor and the sides. The carrier unit further includes means for interlocking the carrier unit with guide means, such as track bearings mounted on the underside of the carriage.

DISCLOSURE OF PREFERRED EMBODIMENT

Other objects, features and advantages will occur from the following description of a preferred embodiment and the accompanying drawings, in which.

This invention may be accomplished by a carrier unit which has a carriage including a floor and two raised opposing sides spaced to accommodate a magnetic element such as transformer core ribbon. A device in the carriage generates a magnetic force to hold the magnetic element. The carrier unit also includes linkages which join the unit with adjacent carrier units to form a carrier chain.

A magnetic carrier unit according to this invention can utilize a number of different arrangements of magnets. A single magnet may be disposed on the floor of the carriage or, in addition, permanent magnets are provided on the sides. Further, the floor and sides of the carriage may be magnetic to transmit magnetic flux or can be made of a nonmagnetic material such as aluminum. In the latter case, only the inside of the carriage supports a flux path.

This invention may also be accomplished by a winding apparatus for winding a magnetic element through a form. The winding apparatus includes at least one chain of carrier units, a device for driving the chain during loading and winding, and structure which defines the path of the chain during loading and winding.

Figure 1:
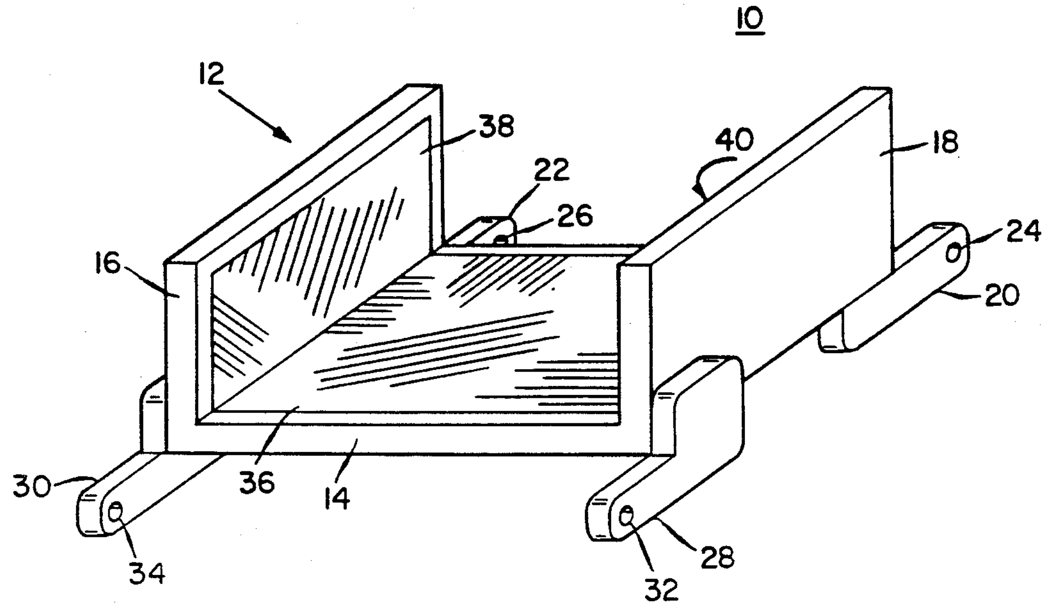
FIG. 1 is an axonometric view of a carrier unit according to this invention.

Carrier unit 10, FIG. 1, has carriage 12 which includes floor 14 and opposing sides 16, 18. Rear links 20, 22 have holes 24, 26, respectively, for receiving a pin to join links 20, 22 with the front links of an adjacent carrier unit. The links are fastened to carriage 12 by welding or other type of attachment. Front links 28, 30 with holes 32, 34 join with the rear links of a successive carrier unit.

Figure 2:
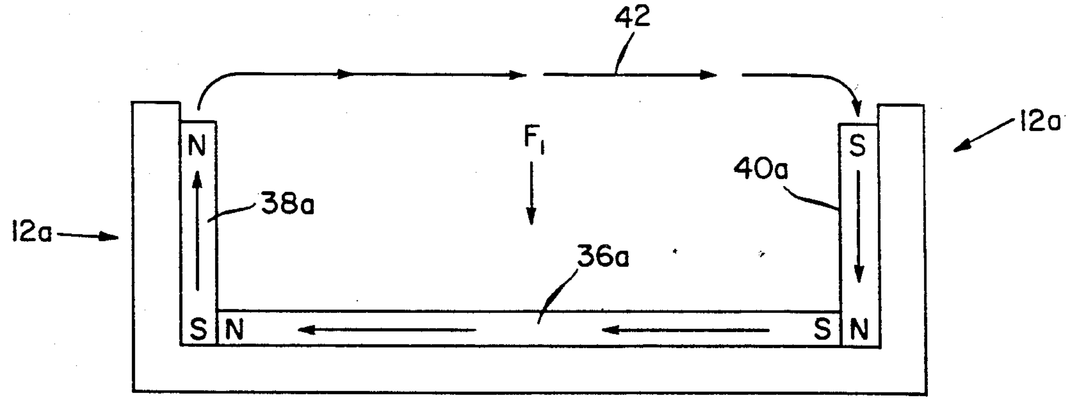
FIGS. 2 and 3 are schematic diagrams of different arrangements of magnets and resultant flux paths in carrier units according to this invention.
Figure 3:
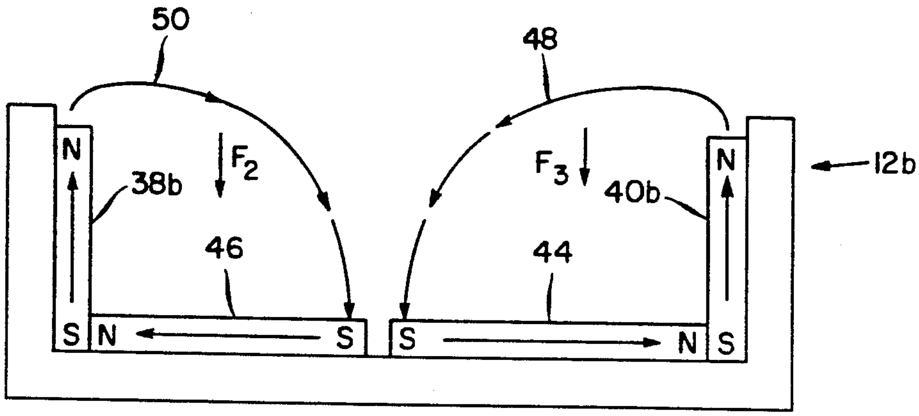

Embedded in carriage 12 are floor magnet 36 and side magnets 38, 40. Different arrangements of permanent magnets within a carrier according to this invention are shown in FIGS. 2 and 3. Carrier 12*a*, FIG. 2, includes a single continuous floor magnet 36*a* and two side magnets 38*a* and 40*a*. The poles of the magnets are arranged as shown to generate flux path 42. Once a magnetic element such as a transformer core ribbon is within carriage 12*a*, the magnetic force $F_1$ resists its removal from carriage 12*a*.

Carriage 12*b*, FIG. 3, utilizes two separate floor magnets 44, 46 which establish flux paths 48, 50 through adjacent magnets 40*b*, 38*b* respectively. This arrangement of magnets produces magnetic forces $F_2$, $F_3$ which holds a magnetic element against the floor of carriage 12*b*.

Figure 4:
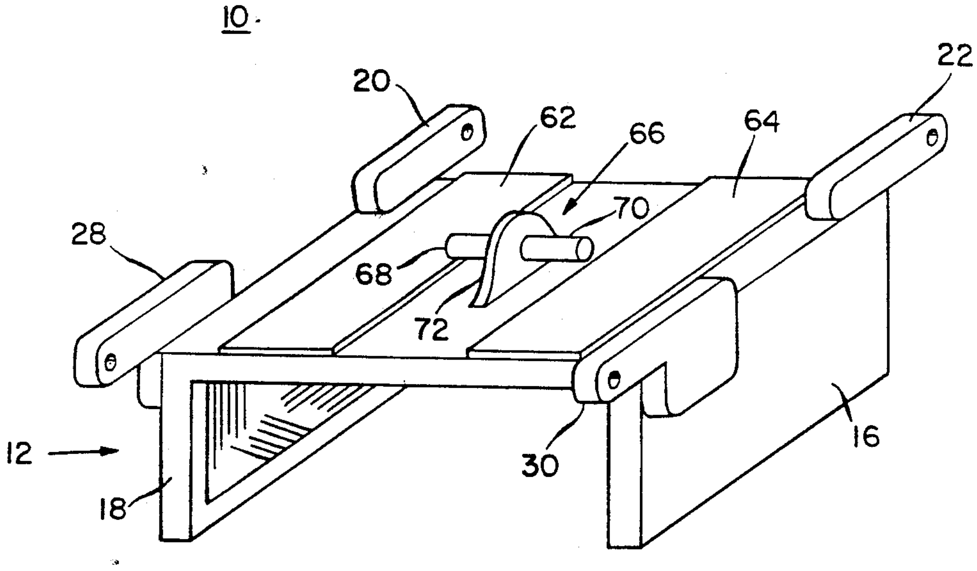
FIG. 4 is an axonometric view of the underside of the carrier unit of FIG. 1.

The underside of carrier unit 10, FIG. 4, contains elements for engaging drive means and for interlocking the carriage unit with a guide rail. Tracks 62, 64 are a high friction material such as rubber or sandpaper. In other constructions tracks 62, 64 have knurling or teeth for engaging drive wheels with matching teeth, as described below.

Track bearing 66 is disposed at the center of carriage 12. Roller bearings 68, 70 are supported by mount 72.

Figure 5:
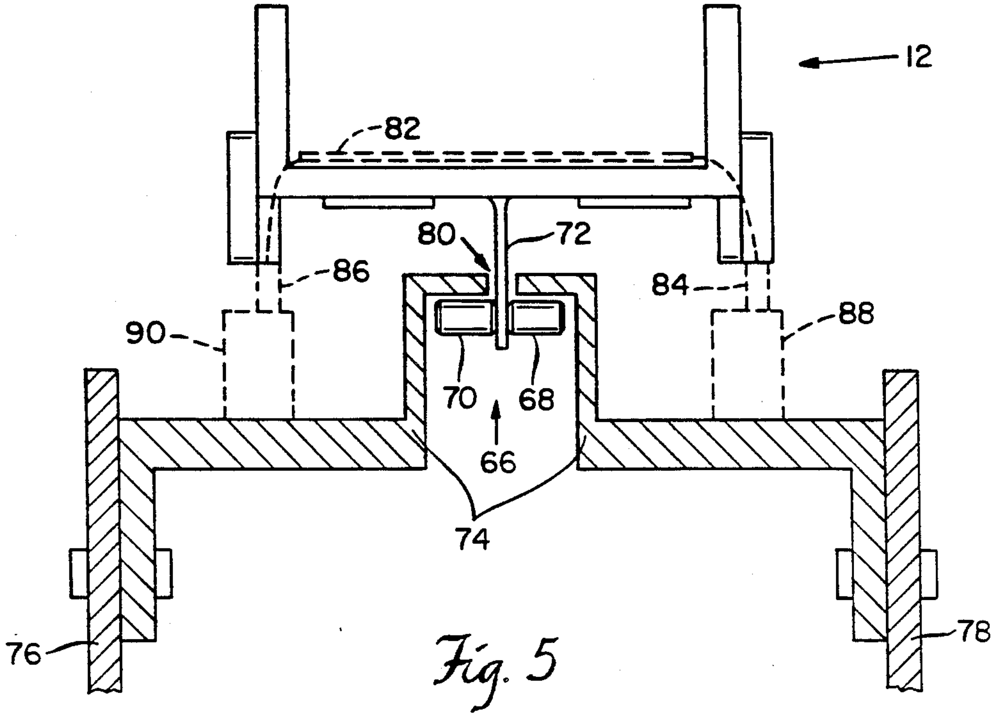
FIG. 5 is a front elevational view of the carrier unit of FIGS. 1 and 4 engaged by a guide rail shown in cross section.

Track bearing 66 is shown in FIG. 5 rollably interlocking with guide rail 74. The term interlock is used to denote that notion of a carrier unit is constrained by guide rail 74 while engaged with it. Guide rail 74 is supported by support structure 76, 78 to maintain gap 80 through which mount 72 passes.

Magnetic force utilized to hold a magnetic element can be generated by electromagnets instead of permanent magnets. Electromagnet 82, is energized by brushes 84, 86, which are spring loaded to contact energized plates 88, 90, respectively.

Figure 6:
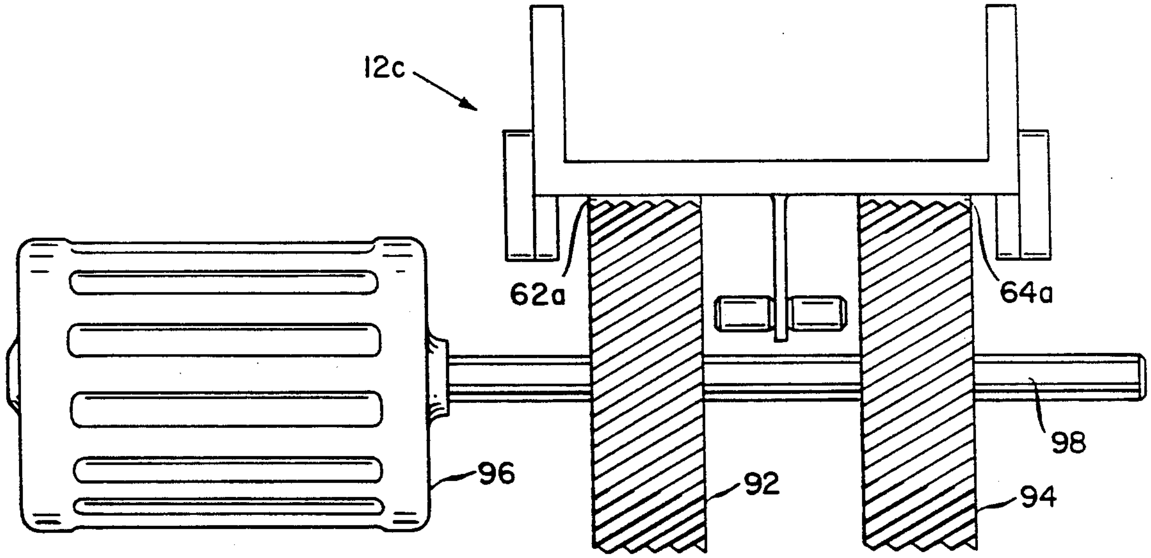
FIG. 6 is a front elevational view of the carrier unit driven by knurled drive gears.

As discussed above, engagement tracks on a carrier unit according to this invention engage with the drive mechanism through frictional contact or intermeshing of teeth. Knurled tracks 62*a*, 64*a*, FIG. 6, engage knurled drive gears 92, 94 which are driven by motor 96 through shaft 98.

A winding apparatus according to this invention is suited for developing a transformer core through prewound transformer coils. Cores for transformers, inductors and the like, by their very nature are made of magnetic alloys; on the other hand, conductor coils are typically made of copper or aluminum which are nonmagnetic. Nonmagnetic material could be selectively magnetically anodized, however, to render it susceptible to the magnetic force exerted by the carrier units.

Figure 7A:
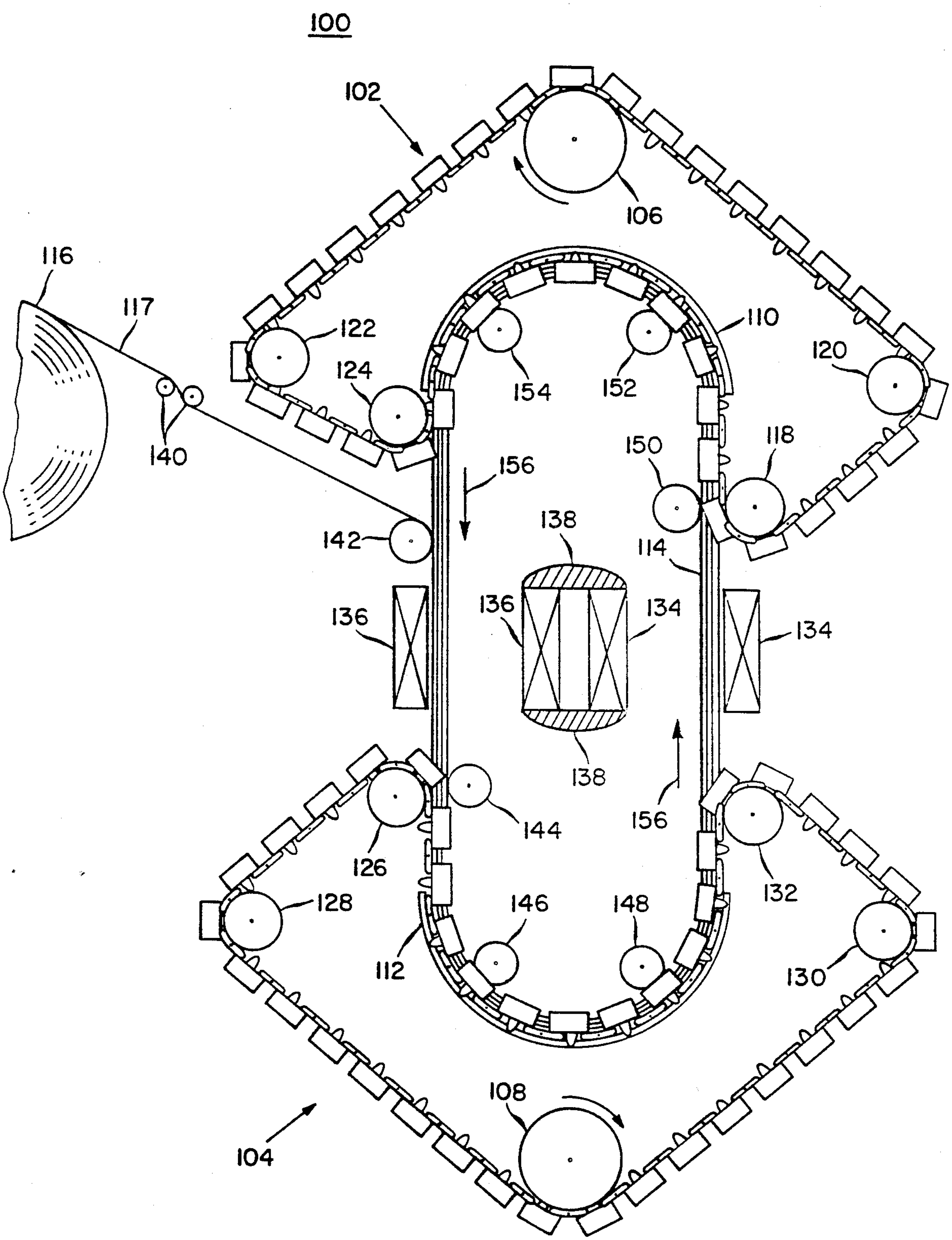
FIG. 7A is a schematic front view of a winding apparatus according to this invention utilizing two carrier chains to form a loading coil of a magnetic element.

Winding apparatus 100, FIG. 7A, utilizes carrier chains 102, 104 each having driving mechanisms 106, 108 and guide rails 110 and 112, respectively. Guide rails 110, 112 are shaped to curve the path of the carrier chains to establish curvature of loading coil 114. The remainder of the paths of chains 102, 104 are directed by cornering wheels 118, 120, 122, 124 and 126, 128, 130, and 132, respectively.

Loading coil 114 is formed from ribbon material provided from source coil 116. In operation, the ribbon material 117 from source coil 116 is fed through transformer coils 134, 136 as bridged by coil caps 138. The start end of ribbon material 117 is fed through tensioners 140, led past guide wheel 142, and fed through transformer coil 136 until chain 104 is reached proximate cornering wheel 126 and hold-down wheel 144, discussed below. The magnetic force of the carrier units of chain 104 now hold the ribbon material. Chain 104 is rotated by drive wheels 108 such that the ribbon start travels past hold-down wheels 146, 148 and approaches cornering wheel 132. At this point the start is lifted off chain 104 and directed through coil 134 until chain 102 is reached. The movement of chains 102, 104 brings the start past hold-down wheels 150, 152 and 154 until ribbon guidewheel 142 is reached. The ribbon start is temporarily taped to the adjacent portion of ribbon 117 thus establishing loading coil 114.

After establishing loading coil 114, chains 102, 104 are driven in the direction indicated by arrows 156 at increasing speed until a sufficient amount of ribbon has been transferred from source coil 116 to loading coil 114 such that an entire transformer core can be formed about coils 134, 136 and caps 138.

Figure 7B:
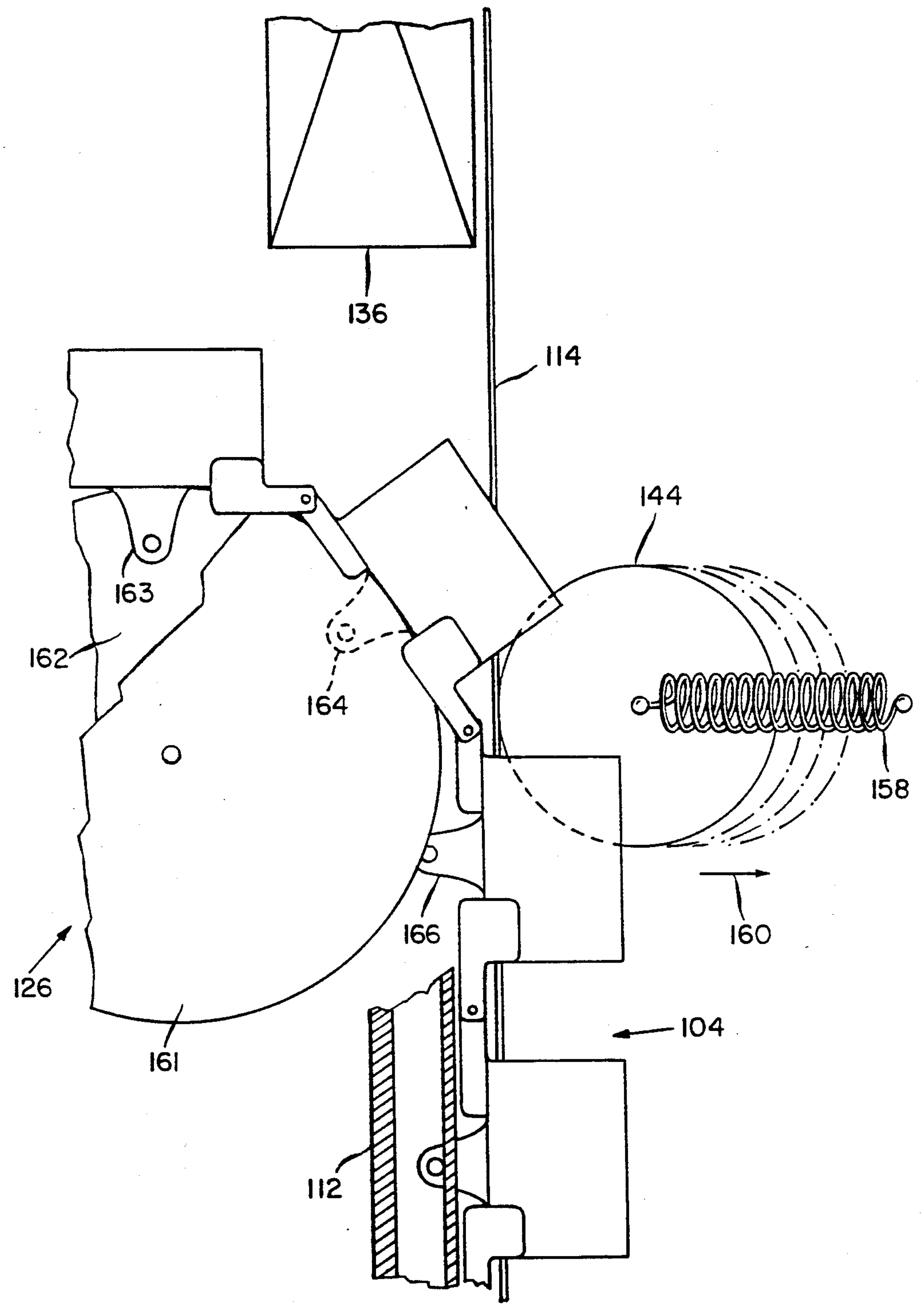
FIG. 7B is an enlarged partial view of a carrier chain and hold-down wheel of FIG. 7A.

Hold-down wheels 144, 146, 148 and 150, 152, 154 are utilized only during the loading phase. These wheels serve to press ribbon material down to the floor of each carrier unit or against layers of ribbon previously loaded into loading coil 114. As shown in FIG. 7B, hold-down wheel 144 is biased by spring 158 toward carrier chain 104. As loading coil 114 increases in thickness, hold-down wheel 144 is pressed away from chain 104 in the direction indicated by arrow 160.

Cornering wheel 126 is also shown in greater detail as being formed of a pair of wheels. Wheel 161 is partially cut away to reveal wheel 162; track bearings 163, 164 are shown passing between wheels 161, 162. Track bearing 166 is shown preparing to interlock with guide rail 112.

After the loading phase is completed, the hold-down wheels are removed and ribbon 117 is severed from source coil 116. The severed end is taped to the outside of loading coil 114 and the inner start is attached to one of the coil caps 138. Drive wheels 106, 108 are reversed in direction to revolve carrier chains 102, 104 in the opposite direction, indicated by arrow 170, FIG. 8, to form final coil 172.

Ribbon 117 is deposited onto final coil 172 under continuous tension because the magnetic force of the carrier units opposes the peeling-off of the innermost loop of loading coil 114. Locus 174 is an advancing point of separation of ribbon 117 from the inner periphery of loading coil 114. In effect, a feedback mechanism is employed whereby tension on ribbon 117 controls its release from loading coil 114.

Once all but the last loop of ribbon in loading coil 114 is deposited as final coil 172, ribbon 117 is attached under tension to final coil 172 by spot-welding or with quick-acting adhesive. Final coil 172 therefore remains permanently under tension to serve in this example as an effective transformer core.

Figure 9:
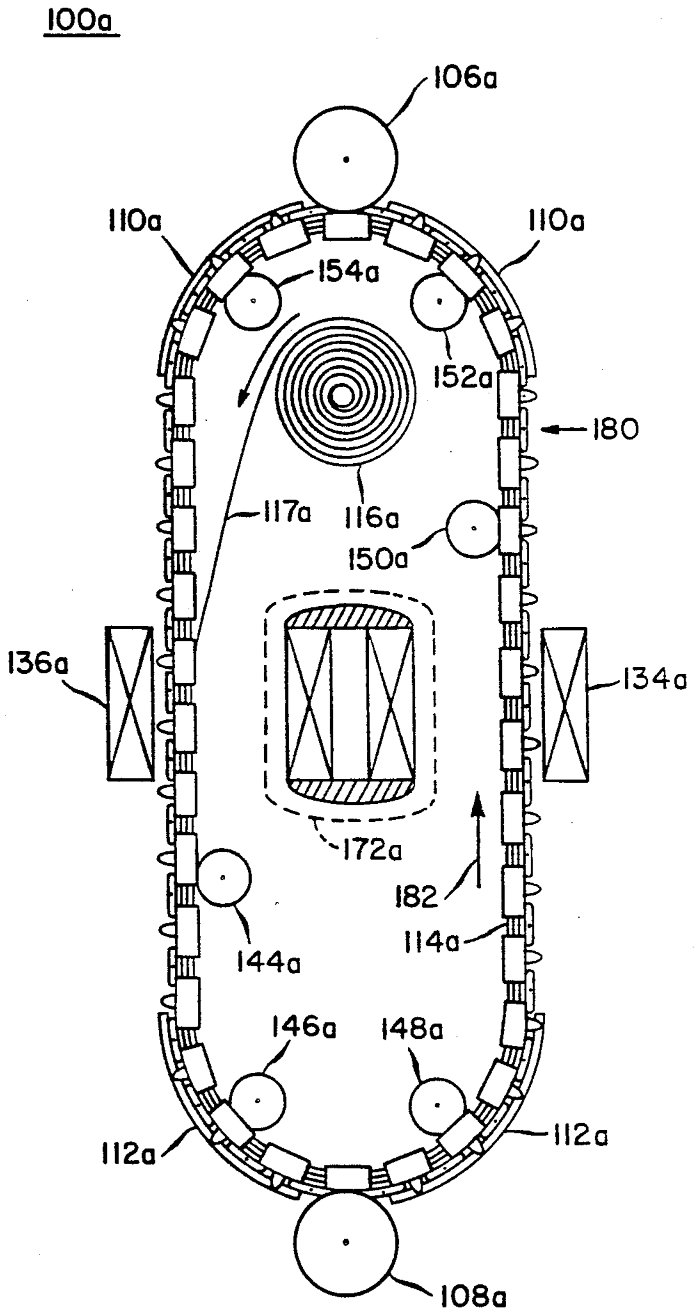
FIG. 9 is a schematic front view of another winding apparatus according to this invention utilizing a single carrier chain to form a loading coil.

Winding apparatus 100*a*, FIG. 9, utilizes a single carrier chain 180 to both load the loading coil 114*a* and to wind final coil 172*a*, shown in phantom. During loading, source coil 116*a* is placed inside of chain 180, which is rotated in the direction indicated by arrow 182 by drive wheels 106*a*, 108*a*. Guide rails 110*a*, 112*a* define the path of chain 180 while hold-down wheels 144*a*, 146*a*, 148*a* and 150*a*, 152*a*, 154*a*, respectively, operate during loading as described above.

Figure 8:
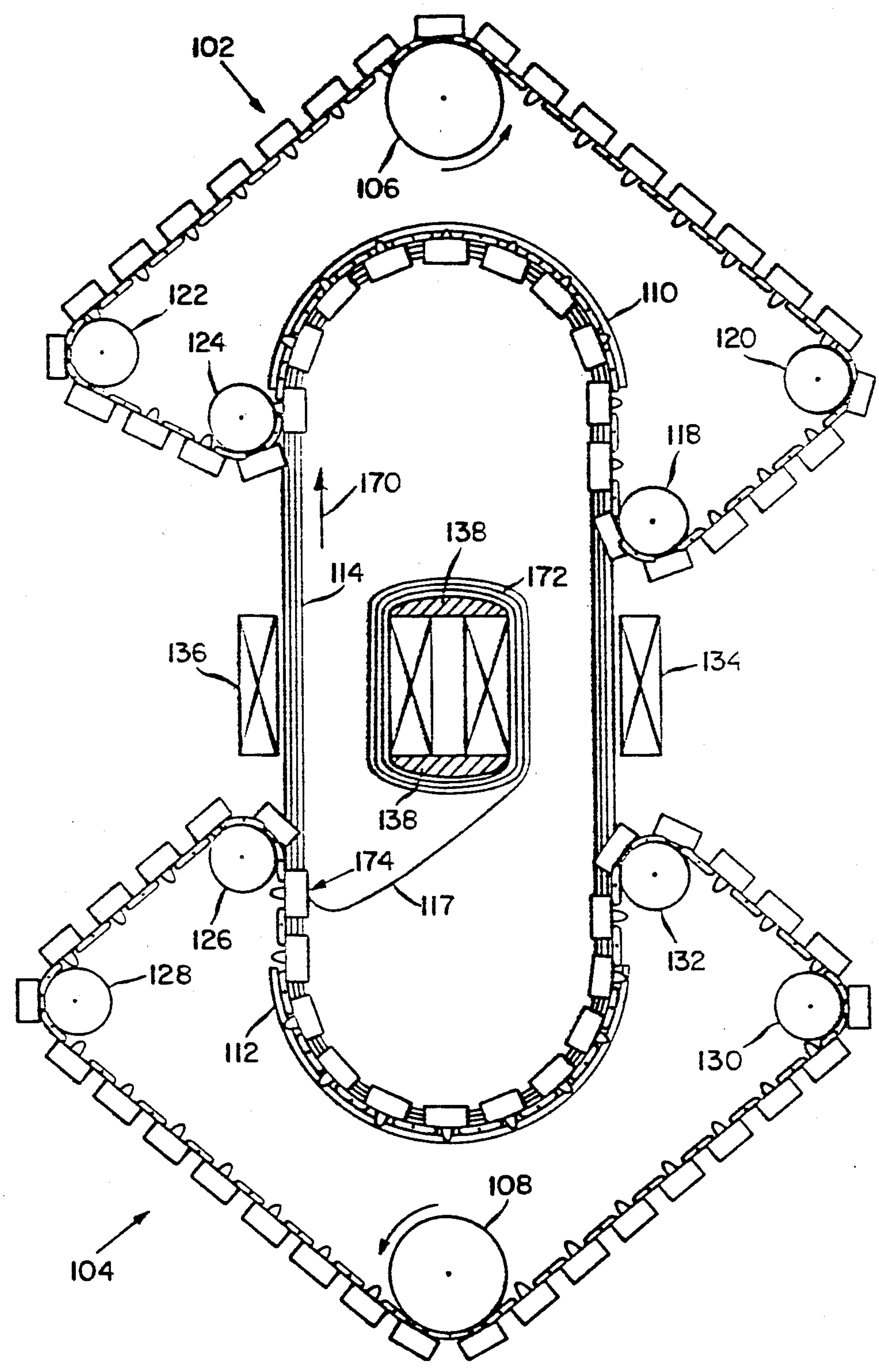
FIG. 8 is a schematic front view of the apparatus of FIG. 7A configured for winding the magnetic element from the loading coil onto a closed form.

Unlike apparatus 100, FIG. 8, chain 180 is driven in the same direction to form final coil 172*a*. This is accomplished by removing source coil 116*a* and the hold down wheels and attaching ribbon 117*a* to coils 134*a*, 136*a*. The magnetic force of the carrier units of chain 180 operate as described above to wind ribbon 117*a* under tension.

Apparatus 100, FIGS. 7A and 8, is not limited to bidirectional rotation and the placement shown for source coil 116. By placing source coil 116 within apparatus 100 during the loading phase, similar to the placement of source coil 116*a*, FIG. 9, chains 102 and 104 are rotated in the same direction for both loading of coil 114 and winding of final coil 172.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A carrier chain for transporting and controllably releasing a magnetic element, comprising a plurality of magnetic carrier units, each unit including:

a carriage having a floor and two raised opposing sides spaced to accommodate a magnetic element;

means, disposed in said carriage, for generating a magnetic force to hold said magnetic element, said means for generating including at least one permanent magnet associated with each of said floor and said sides; and linkage means for joining said unit with adjacent carrier units.

2. A magnetic carrier unit for transporting and controllably releasing a magnetic element, comprising:

a carriage having a floor and two raised opposing sides spaced to accommodate a magnetic element;

means, disposed in said carriage, for generating a magnetic force to hold said magnetic element, said means for generating including at least one permanent magnet associated with each of said floor and said sides; and linkage means for joining said unit with adjacent carrier units.

3. The carrier unit of claim 2 in which said carriage includes means for engaging one or more drive means for propelling said carrier unit.

4. The carrier unit of claim 3 in which said means for engaging includes high friction material disposed on a portion of the underside of said carriage.

5. The carrier unit of claim 2 which said means for magnetically attracting includes at lest one electromagnet.

6. The carrier unit of claim 2 further including means for interlocking said carrier unit with guide means which defines a transport path for said carrier units.

7. The carrier unit of claim 6 in which said means for interlocking includes track bearings mounted on the underside of said carriage and rollably receivable by said guide means.

* * * * *